July 12, 1932.       H. C. BOSTWICK       1,866,994
TIRE CORE AND CHUCK
Filed Dec. 1, 1930       2 Sheets-Sheet 1
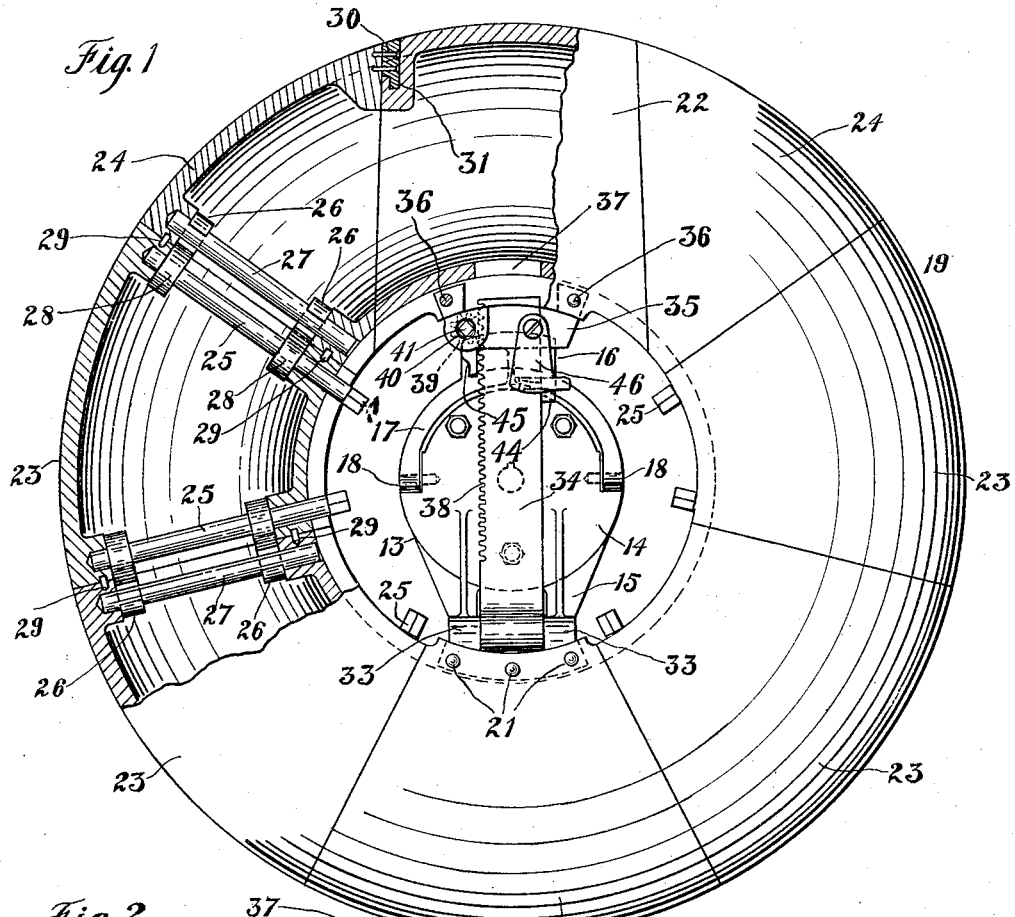
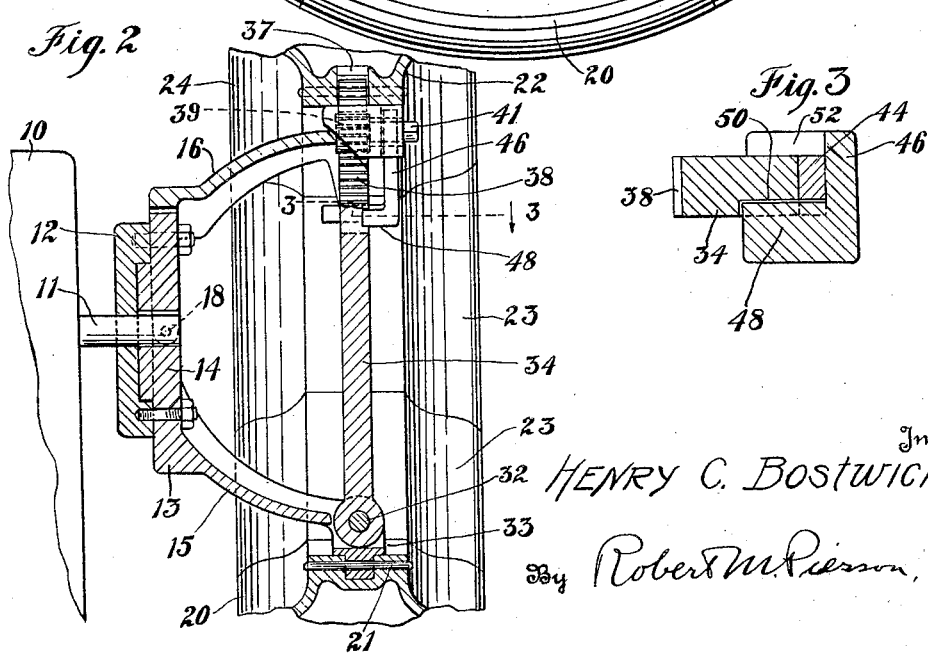
Inventor
HENRY C. BOSTWICK,
By Robert M. Pierson,
Attorney July 12, 1932.  H. C. BOSTWICK  1,866,994
TIRE CORE AND CHUCK
Filed Dec. 1, 1930  2 Sheets-Sheet 2
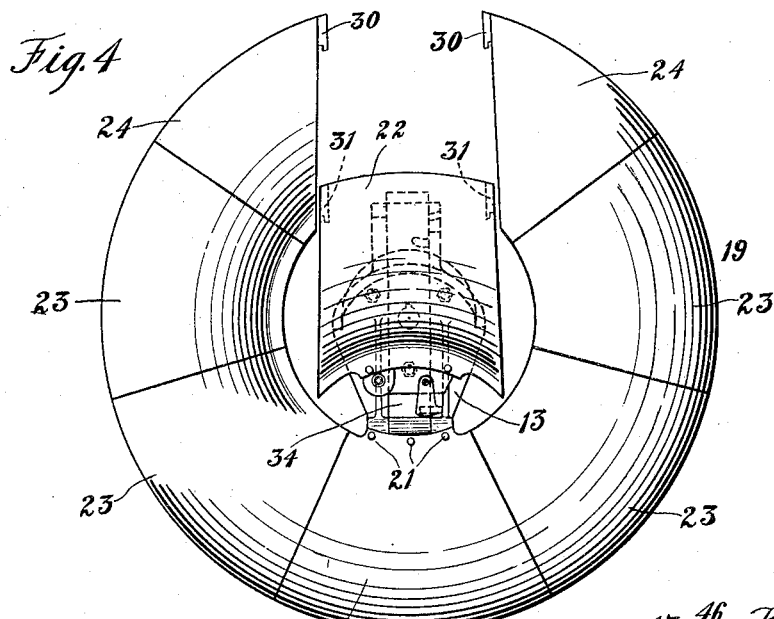
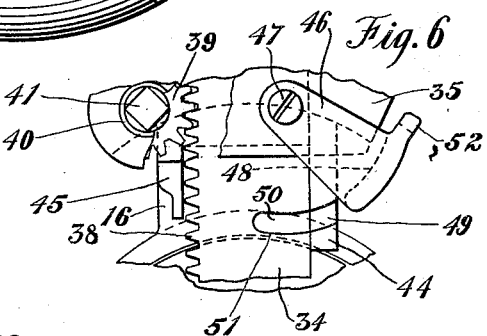
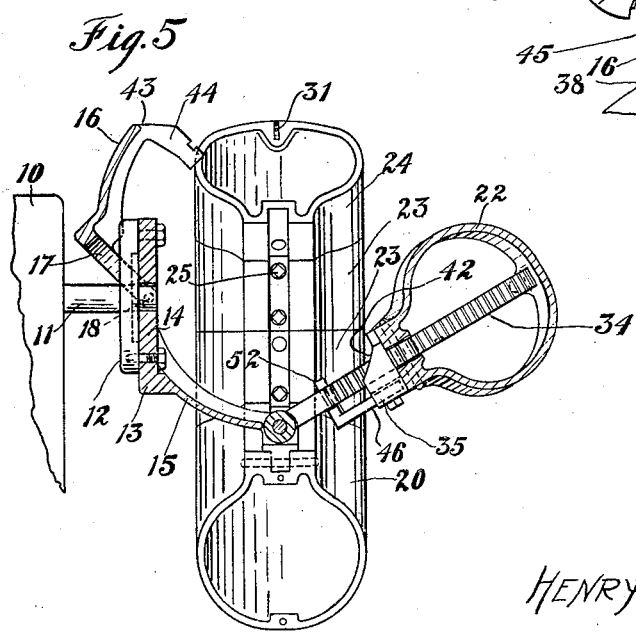
Inventor
HENRY C. BOSTWICK,
By Robert M. Pierson,
Attorney Patented July 12, 1932

1,866,994

UNITED STATES PATENT OFFICE

HENRY C. BOSTWICK, OF AKRON, OHIO, ASSIGNOR TO THE AKRON STANDARD MOLD COMPANY, OF AKRON, OHIO, A CORPORATION OF OHIO

TIRE CORE AND CHUCK

Application filed December 1, 1930. Serial No. 499,309.

This invention relates to tire-building apparatus embodying a collapsible core and a central supporting and operating mechanism commonly known as a chuck, on which the base and key segments of the core are permanently mounted.

The main object of my invention is to provide a simple and easily operated chuck device including improved means for the control of the key segment.

Of the accompanying drawings, Fig. 1 is a front elevation, partly in section, illustrating a preferred form of my invention including a knock-down core, showing the core in its built-up or expanded condition.

Fig. 2 is a partial axial vertical section on a larger scale.

Fig. 3 is a detail horizontal section on the line 3—3 of Fig. 2.

Fig. 4 is a front elevation of the core on a smaller scale, showing the key segment radially withdrawn.

Fig. 5 is a vertical axial section showing the key segment and its guide swung out of the core plane and its lateral support withdrawn.

Fig. 6 is a detail front elevation, partly broken away, illustrating the key segment gearing and lock, with the latter retracted.

In the drawings, 10 is a portion of the casing of a tire-building machine from which projects the end of a horizontal rotary shaft 11 having a flange-plate 12 for supporting the chuck and core assembly. 13 is a hub structure or spider furnished as a part of my improved chuck device and including a shouldered hub plate 14 for fitting on the shaft and flange-plate and bolting to the latter, a forwardly-projecting integral arm 15 formed on said hub plate at one edge thereof, and an arm 16 normally projecting forwardly from the opposite edge of said plate for laterally supporting the key segment of the chuck, said arm 16 being rearwardly formed with a fork 17 pivotally connected at 18 to the hub plate 14.

19 designates generally an annular core or mandrel having the cross-sectional shape of the interior of a pneumatic tire casing composed of a suitable number of segments, in this instance eight, to permit easy withdrawal of the individual segments from a tire casing of relatively large section and small inner periphery. 20 is a base segment connected by rivet pins 21 at its inner periphery to the forward extremity of the spider arm 15, 22 is a key segment located opposite said base segment, and 23, 24 are intermediate or side segments, the segments 20, 23 and 24 being divided from each other on radial planes and the key segment 22 being divided from the adjoining side segments 24 along semi-radial or semi-tangent planes which diverge slightly in an inward direction to provide draft or clearance for the radial inward movement of said key segment.

For large truck, balloon and airplane tire casings to be used on small wheels, it is preferred to provide a knock-down core whose base and key segments alone remain in the apparatus when the tire is completed and the core removed therefrom, the intermediate segments being completely detachable and removable. In such an assembly, for locking the side or intermediate segments to each other and to the base segment, I prefer to employ the means herein illustrated and made the subject of a separate application, Ser. No. 497,662, filed Nov. 24, 1930, comprising rock-shafts 25, journaled in the inner and outer walls of the hollow segments 23 near their end faces and having squared inner ends projecting at the inner periphery of the core for receiving a socket wrench to turn said rock-shafts, a pair of hooked locking dogs 26 fixed to each of the shafts 25 adjacent said inner and outer walls respectively, for engaging keeper rods 27 fixed in positions parallel to the shafts 25 on each of the adjacent segments, and hub cams 28 on said hooked dogs adapted, when the shafts 25 are reversely rotated, to break the joints by separating the adjoining segments and withdrawing a pair of dowels 29 provided on one segment at each of the radial joints and entering dowel holes on the opposed segment. It will be understood that other forms of locking devices for connecting adjoining segments of a collapsible core of the type herein illustrated may be employed, and also that my invention is not wholly limited to making some of the core segments completely detachable, since with cores for tires of relatively smaller section and larger inner periphery, the side segments may be hinged to the base segment, and hinged to each other when there is more than one on each side, in accordance with well-known practice, or they may be connected in any other suitable manner.

The key segment 22, when the core is expanded, is connected at its outer periphery with the adjoining segments 24 by radially engaging locks of the tongue-and-groove or hook type comprising tongue members 30 on the segments 24 adapted to enter locking grooves 31 in the segment 22.

All segments are hollow and preferably made of a light metal such as an aluminum alloy, the locks and other fittings and chuck parts being of a stronger metal or metals such as steel, bronze, etc.

The key segment 22 is controlled and guided in a novel manner which I shall now describe. On a hinge pintle 32 mounted in the plane of the core between ears 33 on the spider arm 15, is pivoted a guide bar 34 which normally stands diametrically across the core aperture. Said bar is slidingly connected with the key segment 22 by means of a bracket 35 fastened to the inner periphery of said segment by rivet pins 36 and centrally apertured to receive the guide bar, the inner peripheral wall of the segment being also apertured at 37 in line with the aperture in said slide bracket, to receive the end of the guide bar within the hollow interior of the key segment when the latter is moved inwardly toward the center of the core.

I prefer to employ a suitable means for positively moving the key segment 22 in and out on its guide bar 34 under manual actuation, and while such means might take various forms, a simple and satisfactory expedient is a rack and gear pinion as illustrated in the drawings, 38 being rack teeth formed on one edge of the guide bar and 39 being a coacting gear pinion having a short shaft 40 mounted to turn on an axis transverse to the core plane in a bearing on the slide bracket 35 and formed with a squared forward end 41 for receiving a socket wrench to turn said gear pinion.

The rear side of the slide bracket 35 is formed with an arcuate abutment face 42 which coacts with a corresponding abutment face 43 on the movable spider arm 16, curved on an arc centered at the hinge axis 18, for affording lateral support to the key segment 22 when the core is in its expanded condition. The end of arm 16 is formed with two depending jaws 44, 45 adapted, when said arm is depressed to its operative position as represented in Figs. 1, 2 and 6, to embrace the guide bar 34 between them and steady said bar against movement in the plane of the core.

For locking the key segment 22 to the guide bar 34 in the outward or operative position of said segment and also locking said bar to the arm 16 against forward movement out of the plane of the bar, I provide a locking dog 46 pivoted at 47 to the bracket 35 for swinging movement in the plane of the core, past the front face of bar 34, said dog having formed on its rear face at the lower end an arcuate tongue 48 adapted to pass through a groove 49 in the jaw 44 and enter an arcuate recess 50 formed in the front side of the guide bar 34, the shoulder 51 at the lower side of said recess acting as a keeper or abutment for engagement by the tongue 48 to hold the key segment against inward movement on the guide bar.

In like manner the upper shoulder of recess 50 coacting with tongue 48, holds the key segment against outward movement on the guide bar, and the two shoulders of groove 49, coacting with tongue 48, tend to prevent relative radial movement between the key segment and jaw 44. Dog 46 is also formed with a U-shaped or hooked locking member 52 adapted to overlap the jaw 44 and the guide bar 34 on their rear side when said dog is swung down into its locking position, and thus to hold the bar 34 against forward movement out of the core plane.

In the operation of my invention, assuming the core to be disassembled, the shaft 11 is turned to bring the base segment 20 lowermost, and the core segment 22 with its guide bar 34 will have been swung outwardly and the chuck arm 16 swung backwardly as indicated in Fig. 5. The core is then built up by assembling the lower intermediate segments 23 upon the base segment 20, locking them thereto by means of the shafts 25 and locking dogs 26, similarly assembling and locking the upper intermediate segments 23 upon the lower ones and then assembling and locking the segments 24 upon the upper segments 23. Thereupon the guide bar 34 is swung into the plane of the core, and pinion shaft 40 is turned to elevate the key segment 22 into its operative position and engage the locking devices 30, 31. The chuck arm 16 is now swung forward, and the locking dog 46 is swung downwardly from its retracted position indicated in Fig. 6 to the engaged position shown in Figs. 1 and 2, thereby locking the guide bar 34 against forward movement out of the core plane, through the engagement of its hook member 52 with the rear side of the jaw 44, and locking the key segment against inward movement on said guide bar by the engagement of its tongue 48 with the shoulder 51.

When a tire casing has been built on the core, the key segment 22 may be withdrawn radially inward, its guide bar swung forward to carry said segment out of the core plane and the rest of the core dis-assembled by reversing the foregoing operations in an evident manner, and the tire then removed from the base segment 20.

My invention thus provides a simple chuck device for positively operating the key segment of a collapsible tire-building core, together with means for firmly locking said key segment and its associated chuck members together for the purposes set forth.

My invention is not wholly limited to the form herein described but may be variously modified within the scope of the claims.

I claim:

1. Tire building apparatus comprising a guide, and a collapsible tire-building core including a key segment slidably mounted on said guide and formed to receive the latter within its interior.

2. Tire building apparatus comprising a guide provided with a straight gear, a collapsible core including a key segment slidably mounted on said guide, and a gear carried by said segment and meshing with the guide gear.

3. Tire building apparatus comprising a support, a guide pivoted thereon and provided with a gear rack, a collapsible core including a key segment slidably mounted on said guide, and a spur gear pinion carried by said segment and meshing with said rack.

4. Tire building apparatus comprising a rotary support, a segmental core and chuck assembly including a base segment carried by said support, a guide bar pivoted to swing on said support transversely of the core plane, and a key segment slidably mounted on said guide bar and formed to receive the latter within its interior.

5. Tire building apparatus comprising a rotary chuck including a guide bar pivoted to swing transversely of the plane of rotation of the chuck, and a segmental core carried by said chuck and including a hollow key segment slidably mounted on said bar and having an inner peripheral wall apertured to permit the passage of the bar into the interior of the segment as the latter slides toward the core center.

6. Tire building apparatus comprising a rotary chuck including a pivoted guide bar formed with gear teeth on one edge, a core having a key segment slidably mounted on said bar and formed to receive the latter within its interior, and a gear carried by said segment and meshing with the gear teeth on the guide bar for producing movement of the segment along the bar.

7. Tire building apparatus comprising a rotary chuck including a supporting structure, a toothed guide pivoted to said supporting structure, a segmental core including body segments carried by said supporting structure, a key segment, a bracket affixed to said segment and slidingly embracing said guide, and a gear rotatably mounted on said bracket and engaging the teeth of the guide, said gear having a shaft end formed to receive a turning tool.

8. Tire building apparatus comprising a rotary chuck including a guide, a collapsible core mounted on said chuck and having a key segment slidable on the guide, means carried by said segment for moving the latter along the guide, and means for locking said key segment to the guide.

9. Tire building apparatus comprising a rotary chuck including a guide bar formed with keeper means, a collapsible core mounted on said chuck and including a key segment slidable on said bar, and a locking dog pivoted on said segment for movement into and out of coactive relation to said keeper means.

10. Tire building apparatus comprising a rotary chuck having a guide bar pivoted for movement transversely of the plane of chuck rotation, a collapsible core including a key segment geared to said bar for movement along the latter, and a locking dog pivoted to said segment for engaging said bar to hold the segment in its outward position.

11. The combination of a segmental core including a base segment and a key segment, and a chuck attached to said base segment and having a member movable toward and from the core plane and constituting a removable lateral support for the key segment.

12. The combination of a rotary chuck including a pivoted arm, and a segmental core having a base segment fixedly supported by said chuck and a key segment detachably associated with said pivoted arm and laterally supported thereby when said key segment is in its operative position.

13. The combination of a segmental core including a base segment and a key segment, a chuck fixedly supporting said base segment and having an arm laterally supporting the key segment when the core is expanded and pivoted for backward movement from the core plane to release said key segment, and means for locking said arm and key segment together.

14. The combination of a collapsible core including a slidable key segment, and a chuck supporting the core and having a pivoted guide for said key segment and a lateral support for said guide, movable into and out of supporting relation to the guide when the latter is in normal position.

15. The combination of a segmental core including a slidable key segment, a chuck supporting said core and having a key-segment guide pivoted for movement transversely of the core plane, and means for detachably securing the free portion of said guide to the chuck.

16. The combination of a segmental core including a slidable key segment, a chuck supporting said core and including a movable key-segment guide and a movable lateral support for said guide, and a common means for locking said guide to the key segment and to the lateral support.

17. The combination of a segmental core including a slidable key segment, a chuck including a movable guide bar for said key segment and a movable lateral support for said guide bar, and a locking dog pivoted to said key segment and having portions for engaging said guide bar and lateral support and fastening them all together.

18. The combination of a segmental core including a slidable key segment, a chuck including a guide for said segment and a pivoted lateral support for said guide having a pair of jaws embracing the latter, and means for detachably securing said lateral support to the guide and to the key segment.

19. Tire building apparatus comprising a collapsible core having a base segment and a radially slidable key segment, a rotary chuck affixed to said base segment and having a key-segment guide bar pivoted to swing out of the core plane and an arm pivoted to swing toward and from the core plane for laterally supporting said bar, said arm having jaws embracing the bar, and a locking dog pivoted to the key segment and having members coacting with said bar and one of the arm jaws respectively for locking the bar to said jaw and to said key segment in the outward position of the latter.

In witness whereof I have hereunto set my hand this 26th day of November, 1930.

HENRY C. BOSTWICK.